United States Patent
Algüera

(10) Patent No.: US 7,854,443 B2
(45) Date of Patent: Dec. 21, 2010

(54) SYSTEM FOR CONNECTING SUPPLY LINES

(75) Inventor: José Manuel Gallego Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 119 days.

(21) Appl. No.: 11/793,095

(22) PCT Filed: Dec. 16, 2005

(86) PCT No.: PCT/EP2005/013579

§ 371 (c)(1), (2), (4) Date: Jun. 15, 2007

(87) PCT Pub. No.: WO2006/066819

PCT Pub. Date: Jun. 29, 2006

(65) Prior Publication Data

US 2008/0129010 A1    Jun. 5, 2008

(30) Foreign Application Priority Data

Dec. 17, 2004    (DE)    ........................ 10 2004 062 172

(51) Int. Cl.
- B60D 1/64    (2006.01)
- B62D 53/12    (2006.01)

(52) U.S. Cl. ...................................... 280/421; 280/422
(58) Field of Classification Search ................. 280/420, 280/421, 422
See application file for complete search history.

(56) References Cited

U.S. PATENT DOCUMENTS

| | | | | |
|---|---|---|---|---|
| 1,766,780 A | * | 6/1930 | Finch | 280/421 |
| 1,973,610 A | * | 9/1934 | Connors | 280/421 |
| 2,326,442 A | * | 8/1943 | De Wit | 417/139 |
| 2,480,413 A | * | 8/1949 | Kirksey | 280/421 |
| 2,480,483 A | * | 8/1949 | Kirksey | 280/421 |
| 2,693,539 A | * | 11/1954 | Madigan | 307/10.1 |
| 2,733,033 A | * | 1/1956 | Gunderson | 248/51 |

(Continued)

FOREIGN PATENT DOCUMENTS

DE    101 55 056    6/2003

(Continued)

*Primary Examiner*—Tony H. Winner
*Assistant Examiner*—Wesley Potter
(74) *Attorney, Agent, or Firm*—Hudak, Shunk & Farine Co. LPA

(57) ABSTRACT

A system for connecting supply lines between a tractive vehicle and a semi-trailer that can be coupled to the latter, a semi-trailer coupling and an automatic line coupling system comprising at least one connector jack being situated on the tractive vehicle and the semi-trailer having at least one supply circuit comprising a first supply console for connecting to the tractive vehicle and for receiving a plug-in element that is located on at least one supply line of the tractive vehicle and/or a plug that is configured to fit the connector jack. The aim of the invention is to provide a system for connecting supply lines for tractive vehicles, comprising an automatic line coupling system that permits the coupling of conventional semi-trailers. To achieve this, a second supply console is located on the tractive vehicle and is permanently connected to the connector jack of the line coupling system and the plug-in element can be selectively connected to the first or second supply console.

18 Claims, 2 Drawing Sheets

U.S. PATENT DOCUMENTS

| | | | | |
|---|---|---|---|---|
| 3,181,888 A | * | 5/1965 | Boylan et al. | 280/421 |
| 3,653,686 A | * | 4/1972 | Roesies | 280/421 |
| 3,711,122 A | * | 1/1973 | Holmberg et al. | 280/421 |
| 3,858,907 A | * | 1/1975 | Van Raden | 280/422 |
| 3,888,513 A | * | 6/1975 | Pilz et al. | 280/421 |
| 5,060,964 A | * | 10/1991 | Vick | 280/421 |
| 5,346,239 A | * | 9/1994 | Wohlhuter | 280/420 |
| 5,607,221 A | * | 3/1997 | Justus | 362/485 |
| 5,660,408 A | | 8/1997 | Johnson | |
| 2002/0190497 A1 | * | 12/2002 | Metternich | 280/421 |

FOREIGN PATENT DOCUMENTS

| | | |
|---|---|---|
| EP | 0 983 932 | 3/2000 |
| GB | 2 204 844 | 11/1988 |

\* cited by examiner

SYSTEM FOR CONNECTING SUPPLY LINES

FIELD OF INVENTION

The invention concerns a system for connecting of supply lines between a tractor and a semi-trailer which can be coupled to it, wherein a fifth wheel and an automated line coupling system with at least one jack connection is arranged on the tractor, and the semi-trailer has at least one power supply circuit, comprising a first supply console for connecting to the tractor, receiving a plug-in element arranged on at least one supply line of the tractor and/or a plug fashioned complementary to the jack connection.

BACKGROUND OF THE INVENTION

On most of the fifth wheels in use today, tractor and semi-trailer are joined together by flexible supply lines, by which an electrical and pneumatic supply is realized for the semi-trailer. What is more, it is also possible to provide control signals or a hydraulic supply of the semi-trailer by appropriate supply lines. The coupling of the supply lines is done by hand, in that a plug-in element located on the supply line is inserted at the first supply console. Before uncoupling the semi-trailer, the supply lines are separated and the loose plug-in elements are usually hung on parking plug strips arranged on the tractor and secured here for driving without a semi-trailer. Such a prior art is disclosed by GB 2 204 844 A.

Meanwhile, in order to reduce the operating expenses, automated line coupling systems have become known, corresponding to DE 101 55 056 A1, and they have also come to be used to a significant degree. Such a system can comprise, for example, a plug-in wedge engaging with the center pin of the semi-trailer, which is introduced into the entry opening of the fifth wheel during the coupling operation. After this, a laterally movable jack connection is inserted into the plug-in wedge by motorized operation to bring about a contacting. In other systems, stationary mounted plug and socket come together by the coupling process of tractor and semi-trailer.

It would be possible to entirely replace with these new automated line coupling systems the original, manually operated systems with one or more supply lines and a plug-in element located on each one of them, being connected to the first supply console. But this would require, for reasons of compatibility, that all tractors and semi-trailers of a fleet of trucks be fully retrofitted with automated line coupling systems. Otherwise, in mixed truck parks, it might happen that an already retrofitted tractor, for example, cannot supply power and control signals to a conventional semi-trailer.

SUMMARY OF THE INVENTION

For this reason, the basic problem of the invention is to provide a system for connecting of supply lines for tractors with an automated line coupling system, which likewise allows conventional semi-trailers to be mounted.

The problem is solved according to the invention with a system in which a second supply console is arranged on the tractor, being constantly connected to the jack connection of the automated line coupling system, and the plug-in element can be optionally inserted at the first or second supply console.

The second supply console largely corresponds in terms of structure to the first supply console, which is usually mounted on the front side of the semi-trailer. In the event that the tractor is expected to pull a semi-trailer likewise outfitted with a line coupling system, the supplying of the semi-trailer with power and signals, for example, occurs via the supply line and the plug-in element, located thereon, for the second supply console, and from there to the jack connection of the automated line coupling system, which in the coupled condition is already introduced into the plug on the semi-trailer side. The power or signal supply circuit of the semi-trailer will be fed from the plug.

If, however, instead of this, it is necessary to haul a semi-trailer which does not have components of the automated line coupling system, the connecting of the supply line and the plug-in element located thereon can be removed from the second supply console and hooked up directly to the first supply console of the semi-trailer.

Preferably a distributor with a first and second line branch is arranged in the supply circuit, wherein the first line branch is permanently connected to the first supply console and the second line branch to the plug.

This has the benefit that semi-trailers so outfitted could be mounted both on tractors with a line coupling system and on conventionally outfitted tractors. In the case of conventionally outfitted tractors, the supply circuit is hooked up via the first supply console and the first line branch, for tractors with an automated line coupling system it is via the plug and the second line branch.

A check valve (25) should be arranged in the distributor and/or the first line branch and/or the second line branch, see FIG. 3, preventing pressurized air from flowing back from one line branch into the other.

In one advantageous embodiment, the second supply console is connected by a permanent feed line to the jack connection. This is sturdier than a flexible hose or cable connection and it can also be laid on the tractor, with space advantages.

Preferably, the second supply console is arranged on the rear of the driver's cabin of the tractor.

It has likewise proven to be advantageous to bring together several supply lines on a shared console and to connect the shared console to vehicle lines. The shared console should be oriented to the first supply console on the semi-trailer and in spatial proximity to it, that is, mounted at the same height on the tractor, opposite from there.

In an especially favorable design embodiment, a transmission of electric power, compressed air, and/or control signals occurs via the at least one supply line and/or the automated line coupling system.

In view of enhanced operating comfort, the second supply console can be set off to the side from the center axis of the vehicle within reach of an operator standing next to the tractor.

BRIEF DESCRIPTION OF THE DRAWINGS

For a better understanding, the invention shall be explained more closely hereafter by means of three drawings. These show.

DETAILED DESCRIPTION OF THE INVENTION

Figure 1:
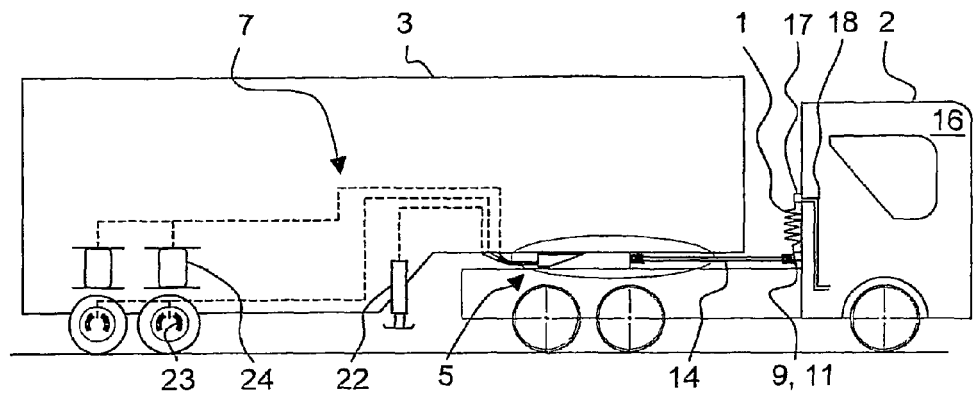
FIG. 1: a schematic side view of a tractor and a semi-trailer with an automated line coupling system.
Figure 1A:
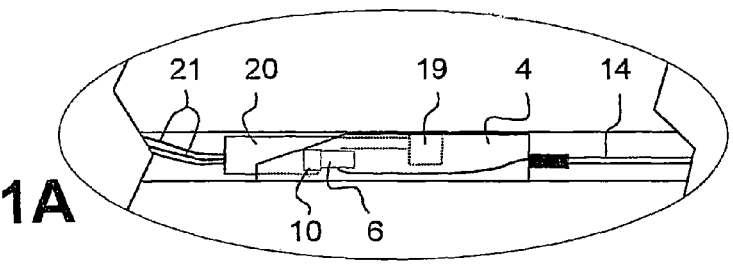
FIG. 1A: an enlarged view of the automated line coupling system in FIG. 1

FIG. 1 shows in a schematic side view a tractor 2 and a semi-trailer 3 fastened to it via a fifth wheel 4 and a center pin 19. Several consumers are arranged on the semi-trailer 3, which have to be supplied with electric power and compressed air. The consumers include electrically operated support jacks 22, arranged in pairs, which receive control signals from the tractor 2 via a bus system, not otherwise shown; a semi-trailer brake 23; and a pneumatic shock absorption 24.

The tractor 2 and the semi-trailer 3 are both outfitted with an automated line coupling system 5, which in the present case comprises the components shown enlarged on the fifth wheel 4. The semi-trailer 3 is mechanically connected via the center pin 19 fixed in the fifth wheel 4 to the tractor 2. The center pin 19 engages with a swiveling plug wedge 20, which projects downward from a wedge-shaped entry opening (not shown) of the fifth wheel 4. This plug wedge 20, because of its shape being complementary to the entry opening, is fixed in the fifth wheel 4, so that no substantial relative motion can occur between plug wedge 20 and fifth wheel 4. In a side wall of the plug wedge 20 lying against the fifth wheel 4 there is a stationary plug 10, in which a laterally movable jack connection 6 has been inserted, thus producing a connection. The supply circuit 7 of the semi-trailer 3 is hooked up to the plug 10 via semi-trailer lines 21 led out from the plug wedge 20 at the back side. The semi-trailer lines 21 are dimensioned such as to allow the semi-trailer 3 to swing out relative to the tractor 2 when negotiating a curve.

For the supplying of the semi-trailer 3, corresponding subassemblies are provided on the tractor 2, which bring electric power or compressed air in familiar fashion via several vehicle lines, of which one line 18 is shown as an example, to a shared console 17 on the back side 15 (see FIG. 3) of the driver's cabin 16. Several supply lines 1 are connected to the shared console 17, of which one supply line 1 is shown.

In the depicted situation of FIG. 1, in which both the tractor 2 and the semi-trailer 3 are outfitted for operation with an automated line coupling system 5, the supply line 1 is connected by its plug-in element 9, mounted at its end, to a second supply console 11. The second supply console 11 engages with a feed line 14, arranged permanently on the tractor 2, by which the required electric power or compressed air is conducted up to the jack connection 6.

Figure 2:
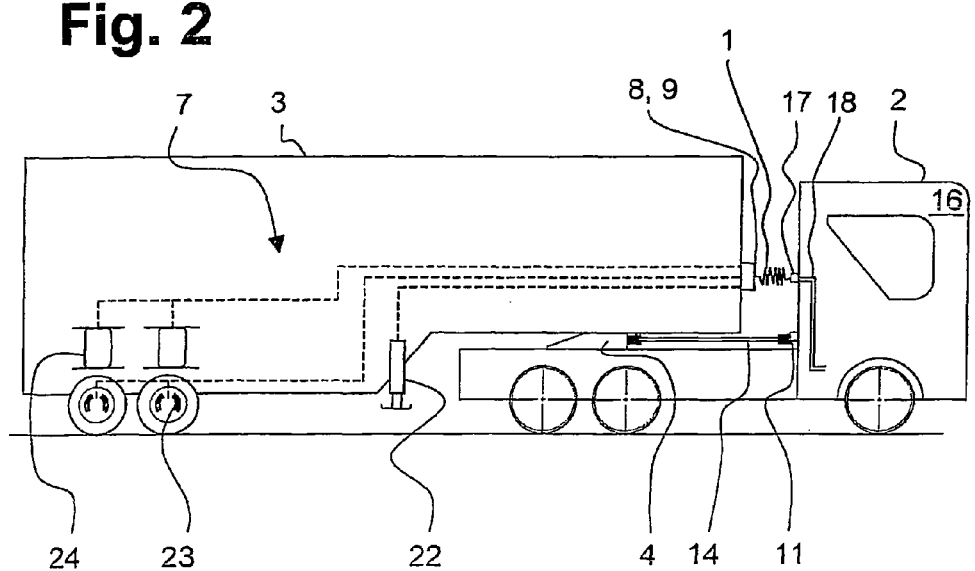
FIG. 2: a view per FIG. 1 of a tractor outfitted with a line coupling system and a semi-trailer coupled to it, with no line coupling system.

Another situation is illustrated by FIG. 2. Here, the tractor 2 has the components of the automated line coupling system 5, not otherwise designated. The semi-trailer 3, however, is conventionally outfitted and must be connected to the tractor 2 by supply lines 1 connected by hand. For this, the plug-in element 9 is loosened from the second supply console 11 located on the tractor 2 and instead the supply line 1 is connected by the plug-in element 9 directly to a first supply console 8 of the semi-trailer 3. In this connection of the semi-trailer 3, the second supply console 11 and the feed line 14 do not carry electric power, control signals, or compressed air. Even though the benefits of an automatic line coupling system 5 cannot be fully utilized in this situation, it is still possible to hook up the semi-trailer 3 to the tractor 2 in conventional fashion and haul it.

Figure 3:
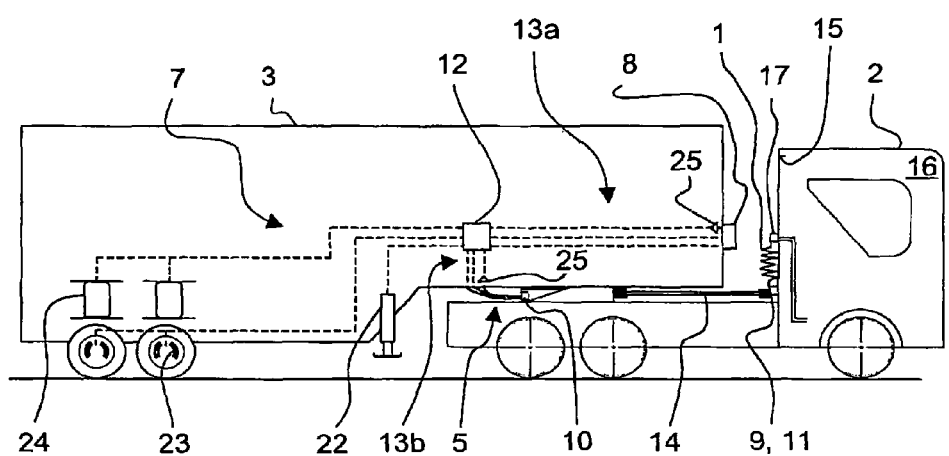
FIG. 3: a view of a tractor and a semi-trailer per FIG. 1 with a first and second line branch.

FIG. 3 shows a modified semi-trailer 3, which can be operated especially easily on tractors 2 with or without components of an automated line coupling system 5. In FIG. 3, both the tractor 2 and the semi-trailer 3 are outfitted with an automated line coupling system 5, for example.

Therefore, the supplying of the semi-trailer 3 occurs via the supply line 1 hooked up to the second supply console 11, the feed line 14, the automated line coupling system 5 and the semi-trailer lines 21 (see enlarged cutout in FIG. 1), which pass into a second line branch 13b. The second line branch 13b empties into a distributor 12, which is integrated into the supply circuit 7. Furthermore, the distributor 12 is connected to a first line branch 13a, which runs to the front end of the semi-trailer 3 and ends at the first supply console 8. This first line branch 13a is dead when the semi-trailer 3 is supplied via the automated line coupling system 5, but it is needed in order to possibly connect the semi-trailer 3 via the first supply console 8 to a tractor 2 without an automated line coupling system.

LIST OF REFERENCE NUMBERS

1 Supply line
2 Tractor
3 Semi-trailer
4 Fifth wheel
5 Automated line coupling system
6 Jack connection
7 Supply circuit for semi-trailer
8 First supply console
9 Plug-in element
10 Plug
11 Second supply console
12 Distributor
13a First line branch
13b Second line branch
14 Feed line
15 Rear of driver's cabin
16 Driver's cabin
17 Shared console
18 Vehicle line
19 Center pin
20 Plug wedge
21 Semi-trailer line
22 Support jack
23 Semi-trailer brake
24 Pneumatic shock absorption

What is claimed is:

1. A system for connecting supply lines between a tractor and a semi-trailer which can be coupled to the tractor, comprising:
    a tractor having a fifth wheel,
    an automated line coupling system with at least one jack connection arranged on the fifth wheel of the tractor and a shared console with at least one supply line arranged on the tractor, the supply line including a plug-in element, and
    a semi-trailer having at least one power supply circuit, having either one or both of (a) a plug fashioned complementary to the jack connection capable of receiving electric power and compressed air via the jack connection, and (b) a first supply console for connecting to the tractor via the plug-in element for providing electric power and compressed air to the semi-trailer,
    wherein the tractor has a second supply console that is constantly connected to the jack connection of the fifth wheel by a permanent feed line, and wherein the plug-in element of the coupling system is capable of connection to the second supply console to provide the jack connection with electric power and compressed air.

2. The system according to claim 1, wherein the semi-trailer has both the plug and the first supply console, and wherein a distributor with a first and a second line branch is arranged in the supply circuit, wherein the first line branch is permanently connected to the first supply console and the second line branch is connected to the plug.

3. The system according to claim 2, wherein a check valve is arranged in one or more of the distributor, the first line branch, and the second line branch.

4. The system according to claim 3, wherein the second supply console is arranged on the rear of a driver's cabin of the tractor.

5. The system according to claim 4, wherein the tractor includes several supply lines including said at least one supply line and the several supply lines are brought together on the shared console and the shared console is connected to vehicle lines.

6. The system according to claim 5, wherein a transmission of the electric power, the compressed air, and control signals occurs via one or more of the at least one supply line and the automated line coupling system.

7. The system according to claim 6, wherein the second supply console is set off to the side from the center axis of the vehicle within reach for an operator standing next to the tractor.

8. The system according to claim 1, wherein the second supply console is arranged on the rear of a driver's cabin of the tractor.

9. The system according to claim 1, wherein the tractor includes several supply lines including said at least one supply line and the several supply lines are brought together on the shared console and the shared console is connected to vehicle lines.

10. The system according to claim 1, wherein a transmission of the electric power, the compressed air, and control signals occurs via one or more of the at least one supply line and the automated line coupling system.

11. The system according to claim 1, wherein the second supply console is set off to the side from the center axis of the vehicle within reach for an operator standing next to the tractor.

12. A system for connecting supply lines between a tractor and a semi-trailer which can be coupled to the tractor, comprising:
   a tractor having a fifth wheel,
   an automated line coupling system with at least one jack connection arranged on the fifth wheel of the tractor and wherein the tractor includes a shared console having at least one supply line connected thereto, the supply line having a plug-in element arranged thereon, and
   a semi-trailer having at least one power supply circuit, having either one or both of (a) a plug fashioned complementary to the jack connection capable of receiving electric power and compressed air via the jack connection, and (b) a first supply console for connecting to the tractor via the plug-in element of the coupling system for providing electric power and compressed air to the semi-trailer,
   wherein the tractor has a second supply console that is constantly connected to the jack connection of the line coupling system by a permanent feed line, and the plug-in element of the coupling system is capable of connection to the second supply console on the tractor to provide the jack connection with electric power and compressed air.

13. The system according to claim 12, wherein the semi-trailer has both the plug and the first supply console, and wherein a distributor with a first and a second line branch is arranged in the supply circuit, wherein the first line branch is permanently connected to the first supply console and the second line branch is connected to the plug.

14. The system according to claim 13, wherein a check valve is arranged in one or more of the distributor, the first line branch, and the second line branch.

15. The system according to claim 12, wherein the second supply console is arranged on the rear of a driver's cabin of the tractor.

16. The system according to claim 12, wherein the tractor includes several supply lines including said at least one supply line and the several supply lines are brought together on the shared console and the shared console is connected to vehicle lines.

17. The system according to claim 12, wherein a transmission of the electric power, the compressed air, and control signals occurs via one or more of the at least one supply line and the automated line coupling system.

18. The system according to claim 12, wherein the second supply console is set off to the side from the center axis of the vehicle within reach for an operator standing next to the tractor.

* * * * *